United States Patent
Austin et al.

(10) Patent No.: US 12,367,758 B2
(45) Date of Patent: Jul. 22, 2025

(54) SMART ACCESSORY FOR COMMUNICATING AN INTENTION TO CROSS A STREET

(71) Applicant: Toyota Motor Engineering & Manufacturing North America, Inc., Plano, TX (US)

(72) Inventors: Benjamin Piya Austin, Saline, MI (US); Rohit Gupta, Santa Clara, CA (US); William Patrick Garrett, Plymouth, MI (US); Rebecca L. Kirschweng, Bloomfield Hills, MI (US); Philip J. Babian, Canton, MI (US); Ali C. Eren, Flower Mound, TX (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 71 days.

(21) Appl. No.: 18/522,789

(22) Filed: Nov. 29, 2023

(65) Prior Publication Data
US 2025/0174118 A1    May 29, 2025

(51) Int. Cl.
*G08G 1/005* (2006.01)
*G06F 3/01* (2006.01)

(52) U.S. Cl.
CPC ............. *G08G 1/005* (2013.01); *G06F 3/011* (2013.01)

(58) Field of Classification Search
CPC ................................ G08G 1/005; G06F 3/011
See application file for complete search history.

(56) References Cited

U.S. PATENT DOCUMENTS

| 11,451,536 B2 | 9/2022 | MacLean et al. |
| 11,553,754 B2 | 1/2023 | Andon et al. |
| 11,605,255 B2 | 3/2023 | Maclean et al. |
| 2010/0013739 A1* | 1/2010 | Sako ............. G06F 3/0484 345/8 |
| 2018/0121432 A1* | 5/2018 | Parson ............ G06F 16/635 |

FOREIGN PATENT DOCUMENTS

| DE | 19837151 A1 | 4/2000 |
| KR | 20200004778 A | 1/2020 |
| KR | 102554636 B1 | 10/2022 |
| WO | 2020152537 A1 | 7/2020 |

OTHER PUBLICATIONS

Emmet White, "Feds Propose New Vehicle Pedestrian Safety Standard", May 25, 2023, US.

* cited by examiner

*Primary Examiner* — Omeed Alizada
(74) *Attorney, Agent, or Firm* — Christopher G. Darrow; Darrow Mustafa PC

(57) ABSTRACT

System, methods, and other embodiments described herein relate to improving communication of user intent at a road crossing. In one embodiment, a method includes acquiring sensor data identifying a blood flow in a brain of a user, determining whether the user intends on crossing a street based, at least in part, on the sensor data, and in response to determining the user intends on crossing the street, communicating an intent to cross using the accessory.

20 Claims, 4 Drawing Sheets

SMART ACCESSORY FOR COMMUNICATING AN INTENTION TO CROSS A STREET

TECHNICAL FIELD

The subject matter described herein relates, in general, to improving the communication about an intention of a user, and, more particularly, to using a smart accessory that communicates an intention to cross a street.

BACKGROUND

Pedestrians face safety risks when sharing a road with vehicles. Collisions between vehicles and pedestrians are common, especially in poorly lit areas or areas where a pedestrian is not easily discernible by a vehicle driver. Further, collisions often occur in areas that require vehicles and pedestrians to share a road. Current methods to enhance pedestrian safety on shared roads include the addition of streetlights, crosswalks, and pedestrian crosswalk signals. However, there are many locations in which none of these safety enhancements exist. Accordingly, pedestrians and vehicles are left to deciding the proper manner of interacting with one another to avoid undesirable road incidents. Because there is no standard method of communicating between pedestrians and vehicles, it is easy for pedestrians and vehicles to misunderstand one another.

It is common for drivers and pedestrians to communicate using facial expressions and gestures. For example, a driver may communicate that they are allowing a pedestrian to cross a street by smiling or waiving. In response, pedestrians usually smile or waive to acknowledge the driver's communication before entering the crosswalk. However, pedestrians with communication difficulties and disorders may have difficulties interacting with drivers. For example, pedestrians with limited communication skills may have difficulties understanding when a driver is giving them permission to cross a street and/or may not know how to appropriately respond with facial expressions and gestures. As a result, a driver and pedestrian may enter a crosswalk at the same time, leading to an increased risk of collision.

As another example, even if a pedestrian intends on crossing a street, the pedestrian may avoid communicating with a driver altogether (e.g., by avoiding eye contact) to minimize unwanted interactions. If there is no interaction between the pedestrian and driver, the driver may choose to ignore the pedestrian and divert attention elsewhere, leading to an increased risk of collision. Accordingly, if the intent to cross a street is not made clear or is not noticed by a driver, an unsafe road incident may occur.

SUMMARY

In one embodiment, example systems and methods relate to a manner of improving communication between a user and vehicle are disclosed. As previously discussed, it is common for pedestrians and vehicles to have difficulties communicating with one another. For example, it may be difficult for pedestrians with limited communication skills or others to convey an intent to cross a street to a driver. A lack of clear communication between vehicles and pedestrians may lead to unsafe road incidents. For example, if a driver mistakenly believes that a pedestrian has no intention of crossing a street and enters a crosswalk at the same time as the pedestrian, a collision between the vehicle and pedestrian may occur. Other unsafe road incidents that can result from a lack of communication may include collisions between vehicles, erratic vehicle maneuvers to avoid colliding with a pedestrian, traffic delays, and angered drivers.

Therefore, in one embodiment, a system that improves communicating an intention of a user via an accessory that activates a lighting mechanism is disclosed. In one aspect, the system is implemented in a wearable device, such as a hat, headband, cap, helmet, headphones, etc. Accordingly, in one configuration, the system acquires sensor data about the user from one or more sensors embedded in the wearable device of the user. The sensors are, in one or more embodiments, near infrared spectroscopy (NIRS) sensors that measure the blood flow in the brain of the user, also referred to as functional NIRS (fNIRS).

In one approach, the system processes the sensor data to determine whether the user intends on crossing the street. The system, in one or more configurations, determines an intent of the user by analyzing the sensor data to identify an intent of the user to take a step and to identify that the user is in a location and position associated with crossing a street. The blood flow to the premotor cortex, the motor cortex, and/or dorsolateral prefrontal cortex of the brain provides insight about an intent of the user. Thus, analyzing the blood flow to identify blood flow to the premotor cortex, motor cortex, and/or dorsolateral prefrontal cortex informs the system that the user intends on stepping. In one arrangement, the system determines that the user intends on taking a step when the blood flow is flowing to the premotor cortex, the motor cortex, and/or dorsolateral prefrontal cortex. In one embodiment, the system determines whether the user intends on taking a step by utilizing a machine learning model. In one approach, the model learns when a user intends on taking a step by correlating a real-time blood flow pattern of the user with learned instances of the user and/or other users taking a step. If the machine learning model identifies the characteristics of the real-time blood flow as correlating with the learned blood flow pattern, the system determines that the user intends on taking a step.

In response to determining that the user intends on taking a step, the system determines whether the user is in a location and position in which the user should inform other road users. When the user is in a location and position in which the user should inform other road users, the system communicates the intent to cross using an accessory of the user. In one approach, the system communicates the intent to cross by activating a lighting mechanism in the accessory of the user. The system may, in one or more embodiments, vary the color, brightness, and/or flashing rate of the lighting mechanism depending on the confidence level associated with the user crossing a street. In one approach, the confidence level is based, at least in part, on a correlation of the real-time blood flow pattern with the learned blood flow pattern associated with the user taking a step. Further, the confidence level may be based on a location of the user. For example, a low confidence level may be associated with the machine learning model determining that the blood flow does not correlate to a learned blood flow of the user or with the system receiving insufficient data to determine the position and location of the user. On the other hand, a high confidence level may be associated with the machine learning model identifying that the user's current blood flow highly correlates to the learned blood flow pattern. In this way, the system improves the process of communicating an intention of a user to cross a street.

In one embodiment, a system is disclosed. The system includes one or more processors and a memory communicably coupled to the one or more processors. The memory storing instructions that, when executed by the one or more processors, cause the one or more processors to acquire sensor data identifying a blood flow in a brain of a user, determine whether the user intends on crossing a street based, at least in part, on the sensor data, and responsive to determining the user intends on crossing the street, communicate an intent to cross using the accessory.

In one embodiment, a non-transitory computer-readable medium and including instructions that when executed by one or more processors cause the one or more processors to perform one or more functions is disclosed. The instructions include instructions to acquire sensor data identifying a blood flow in a brain of a user, determine whether the user intends on crossing a street based, at least in part, on the sensor data, and responsive to determining the user intends on crossing the street, communicate an intent to cross using the accessory.

In one embodiment, a method is disclosed. In one embodiment, the method includes acquiring sensor data identifying a blood flow in a brain of a user, determining whether the user intends on crossing a street based, at least in part, on the sensor data, and in response to determining the user intends on crossing the street, communicating an intent to cross using the accessory.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
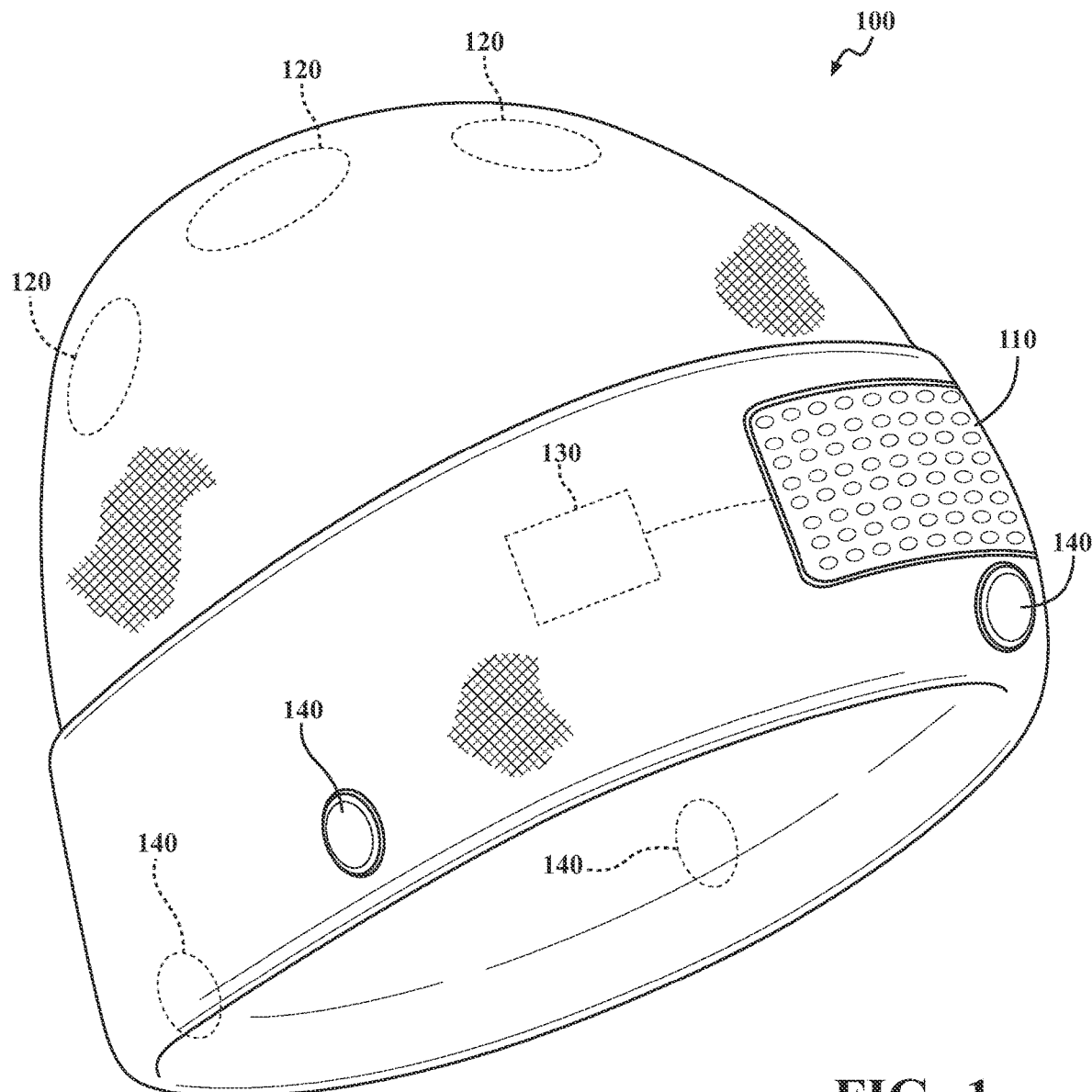
FIG. 1 illustrates one embodiment of an accessory within which systems and methods disclosed herein may be implemented.

Systems, methods, and other embodiments associated with improving communication of an intention of a user to cross a roadway are disclosed herein. As previously discussed, unsafe road incidents may arise from a lack of communication between pedestrians and vehicles. For example, if a pedestrian does not clearly communicate an intent to cross a street, a vehicle may enter a crossing at the same time, leading to a collision, erratic driving behavior, upset drivers, traffic delays, etc. Therefore, in one embodiment, a system that improves communicating an intention of a user via an accessory that activates a lighting mechanism is disclosed.

In one aspect, the system is implemented in a wearable device, such as a hat, headband, cap, helmet, headphones, or other accessory of a user. Accordingly, in one configuration, the system acquires sensor data about the user from sensors embedded in the wearable device of the user. The sensors are, in one or more embodiments, near infrared spectroscopy (NIRS) sensors that measure the blood flow in the brain of the user or other sensors capable of measuring electrical brain activity such as electroencephalogram (EEG) sensors. Further, the accessory can acquire information about surroundings of the user using sensors on the accessory, such as cameras. The system may also acquire additional information about the user and/or surrounding environment from nearby infrastructure, vehicles, user devices, and other sensors of the wearable device. For example, the system can acquire the location of the user from a global positioning sensor (GPS) integrated into a smartphone of the user. The system may also acquire position, orientation, and behavior information associated with the user from cameras and other sensors. As an example, the system may acquire information indicative of actions the user is taking, such as whether the user is looking across a roadway, looking at their phone, talking to a friend, etc.

In one approach, the system processes the sensor data to determine whether the user intends on crossing the street. The system, in one or more configurations, determines an intent of the user by analyzing the sensor data to identify whether the user is likely to take a step and to identify that the user is in a location and position associated with crossing a street. The blood flow to the premotor cortex and/or the motor cortex of the brain provides insight about an intent of the user. Specifically, an increased blood flow to the premotor cortex and/or motor cortex is indicative of a user planning to take a step. Further, increased blood flow to the dorsolateral prefrontal cortex, which is associated with executive functions (e.g., judgement, planning, decision-making, etc.), can additionally indicate that pedestrian is planning to initiate a movement.

Thus, analyzing the blood flow to identify blood flow to the premotor cortex, motor cortex, and/or dorsolateral prefrontal cortex informs the system that the user intends on stepping. In one arrangement, the system determines that the user intends to take a step when the blood flow increases to the premotor cortex, the motor cortex, and/or the dorsolateral prefrontal cortex or by utilizing a machine learning model that correlates a real-time blood flow of the user with learned instances of users taking a step. For example, the learned blood flow may be learned for the user wearing the accessory or be developed based on a plurality of similar users. If the machine learning model identifies that the characteristics of the real-time blood flow correlate with the learned blood flow pattern, the system determines that the user intends on taking a step.

In response to determining that the user intends to take a step, the system determines whether the user is in a location and position in which the user should inform other road users. In one approach, the system processes the location data to determine whether the user is in a location where the user would be able to/want to cross a street. For example, the system may determine that the user is standing near a stoplight, crosswalk, or across the street from a frequently visited location. The system, in one or more embodiments, also processes the orientation and behavior data of the user to determine whether the user is likely to cross a street. As an example, the system may determine that a user is facing a crosswalk, facing away from a crosswalk, standing near a crosswalk but looking at their phone or talking to a friend, etc. In any case, when the system determines that the user is in a proper location/orientation and is acting as if they intend on crossing the street, the system communicates the intent to cross using an accessory of the user.

In one approach, the system communicates the intent to cross by activating a lighting mechanism in the accessory of the user. For example, where the accessory is a hat, the system may activate lighting mechanisms that span the circumference of the hat, that are on distinct portions of the hat, that encompass the entire external area of the hat, that are included on the lining of the hat, etc. In general, the design of the system may vary but is configured to convey the intention of the user to cross a street. The system may further communicate with other wearable devices of the user to control the devices to activate lighting mechanisms so that further attention can be drawn to the user. Moreover, the system may control wearable devices of the user to activate (e.g., by using haptics, smart fabric, etc.) to prevent or initiate walking at the proper time. For example, if the system determines that the user intends on crossing a road crossing, the user is wearing smart pants that can prevent/facilitate movement, and the behavior of a surrounding vehicle indicates that the vehicle does not intend on allowing the user to cross the road crossing, the system controls the smart pants to prevent movement of the user by activating smart fabric components in the pants that restrain leg movement of the user.

Additionally, the system can vary the output of the lighting mechanism to draw the attention of nearby drivers to the user. In one configuration, the system receives driver data from nearby vehicles. The driver data can include communication preferences of the driver, where the communication preferences include what kinds of colors and flash patterns a driver responds to quickest. In response to receiving the driver data, the system activates the lighting mechanism in accordance with the communication preferences of the driver. As an example, if the driver responds quickly to flashing red lights, the system controls the lighting mechanism to output a flashing red light to draw the driver's attention to the user quickly.

The system may, in one or more embodiments, vary the color, brightness, and/or flashing rate of the lighting mechanism depending on the confidence level associated with the user crossing a street. In one approach, the confidence level is based, at least in part, on a correlation of the real-time blood flow with the learned blood flow pattern associated with the user taking a step. Further, the confidence level may be based on the location, orientation, and behavior of the user. For example, a low confidence level may be associated with the machine learning model determining that the blood flow does not correlate with the learned blood flow pattern data of the user or with the system receiving insufficient data to determine the position, location, and intended movements of the user. On the other hand, a high confidence level may be associated with the machine learning model identifying that the user's current blood flow pattern highly correlates to the learned blood flow pattern, that the user is currently located at and facing a crosswalk, that the gait of the user is associated with the user intending to cross the crosswalk, and/or that the skin response of the user (as detected by a galvanic skin response (GSR) device) indicates the user likely intends on taking a step. In this way, the system improves the process of communicating an intention of a user to cross a street.

Referring to FIG. 1, an example of an accessory 100 is illustrated. As used herein, an "accessory" is any form of a wearable device. In one or more implementations, the accessory 100 is an accessory configured to be worn on the head of a user. While arrangements will be described herein with respect to hats, it will be understood that embodiments are not limited to hats. In some implementations, the accessory 100 may be any wearable device, such as a device for the head of a user (e.g., a cap, a headband, headphones, or helmet) or the body of a user (e.g., shirt, shoes, jacket, shoelaces, pants, backpack, bag, etc.). As used herein, a "user" is a human, such as a pedestrian, runner, or walker, or animal, such as a dog that can form the intention and execute the function of taking a step.

Some of the possible elements of the accessory 100 are shown in FIG. 1 and will be described along with subsequent figures. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In one configuration, the accessory 100 includes a lighting mechanism 110. The lighting mechanism 110 is, in one or more arrangements, a light that can convey a user intention, such as a light made from an arrangement of light emitting diodes (LEDs). Although FIG. 1 illustrates the lighting mechanism as including one light on the front portion of the accessory 100, various number of lights can be implemented in the lighting mechanism 110 and arranged in different configurations. For example, the lighting mechanism 110 can include lights that surround the entirety of the accessory 100, that form a pattern (e.g., an arrangement of lights that form lines, shapes, etc.) on the accessory 100, and/or that are located on distinct regions (e.g., one light on the front, one on the back, one on each side, etc.) of the accessory 100.

The accessory 100 additionally includes one or more sensors 120 embedded in the accessory 100. In one embodiment, the sensors 120 include at least sensors that can acquire data associated with blood flow in the brain of the user. Accordingly, the sensors 120 include, in one or more embodiments, near infrared spectroscopy (NIRS) and/or functional NIRS (fNIRS) sensors that include a light source and detectors. The brain is a high energy-demand organ and neuronal activation correlates with increases in cerebral blood flow and volume (referred to as "neurovascular" coupling). As such, by measuring changes in the light absorption of different hemoglobin species in the brain, temporal changes in cerebral blood flow can be calculated with fNIRS/NIRS sensors.

The NIRS sensors are placed in various locations of the accessory 100. Although the accessory 100 is illustrated as including three sensors, it should be understood that a different number of sensors can be used (e.g., more or less NIRS sensors), as long as there is a sufficient number to measure the blood flow in the various regions of the brain of the user. In any case, the light source of the NIRS sensor emits near-infrared light which can penetrate biological tissues, including the skull, of the user. When the near-infrared light encounters brain tissue, the light is scattered by various components of the brain tissue, including blood vessels. The detectors measure the intensity of the near-infrared light that reaches the detectors after being scattered by the brain tissue. As near-infrared light travels through the brain tissue, it interacts with hemoglobin molecules in the blood. Oxygenated hemoglobin and deoxygenated hemoglobin have different absorption characteristics in the near-infrared spectrum, where oxygenated hemoglobin absorbs near-infrared light to a lesser extent than deoxygenated hemoglobin.

When brain activity increases in different regions of the brain, the regions of increased brain activity will have an increase in the concentration of oxygenated hemoglobin in local blood vessels which leads to a change in the absorption of near-infrared light in that region. The increase in the concentration of oxygenated hemoglobin in local blood vessels of a particular region/cortex of the brain indicates an increased blood flow to that region of the brain. Increased blood flow to the premotor, prefrontal, and motor cortexes all correspond to movements associated with a user controlling functions of their legs, feet, and toes. Additionally, increased blood flow to the dorsolateral prefrontal cortex corresponds to functions of the user associated with planning. Accordingly, increased blood flow to these regions of the brain can indicate the intention of a user to take a step.

The accessory 100, in one or more arrangements, includes additional sensors beyond the NIRS sensors for monitoring aspects about the user wearing the accessory 100. For example, the accessory 100 can include electroencephalogram (EEG) sensors embedded in the accessory 100 that can measure the electrical activity it in the brain of the user. The electrical activity can correspond to intentions of the user, such as an intention to take a step. For example, the EEG measurements may indicate that the brainwaves emitted by the user's brain every time the user takes a step (or spatial patterns thereof) are unique. Thus, when the user's brainwaves correlate with previous brainwave activity indicative of the user taking a step, it is likely that the user is planning on taking a step. Accordingly, instead of or in addition to using the NIRS sensors to determine the intention of the user, the accessory 100 can include EEG sensors to measure the brain activity of the user. Further, the accessory 100 may include sensors 140 on the exterior portion of the accessory 100 for acquiring sensor data about an environment of the user. The sensors 140 are, in one embodiment, cameras or other imaging devices. For example, the sensors 140 may acquire image data associated with nearby vehicles, crosswalks, infrastructure, etc., in the environment of the user.

In one embodiment, the accessory 100 further includes a lighting system 130 for controlling the activation of the lighting mechanism 110 in response to acquiring and processing the sensor data from the sensors 120. For example, in response to receiving the measured absorption of the blood vessels in the brain of the user wearing the accessory 100, the lighting system 130 determines whether or not the user intends on taking a step. In one arrangement, where the sensors 120 include EEG sensors, the lighting system 130 determines whether or not the user intends on taking a step based on the recorded EEG measurements corresponding to the brain activity of the user. In one configuration, the lighting system 130 controls the lighting mechanism 110 to activate responsive to determining that the user intends on taking a step (i.e., responsive to processing the sensor data associated with the intention of the user) and that the user is in a location where it would be beneficial to inform other road users of the intent (i.e., responsive to processing the sensor data acquired by the sensors 140), such as at a crosswalk.

Figure 2:
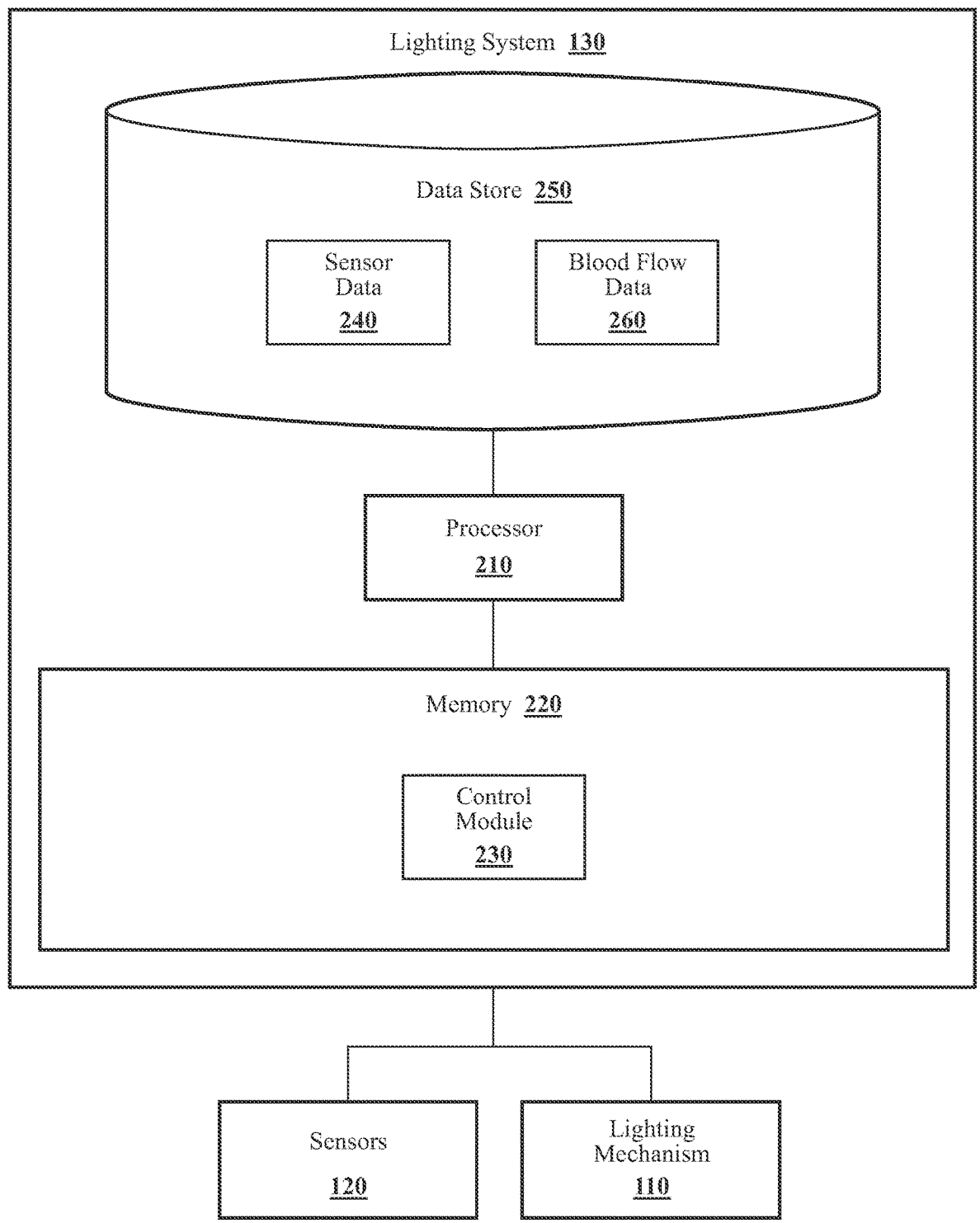
FIG. 2 illustrates one embodiment of a lighting system that is associated with communicating an intention of a user to cross a roadway.

With reference to FIG. 2, one embodiment of the lighting system 130 of FIG. 1 is further illustrated. The lighting system 130 is shown as including a processor 210. Accordingly, the processor 210 may be a part of the lighting system 130, the lighting system 130 may include a separate processor from the processor 210 of the accessory 100, or the lighting system 130 may access the processor 210 through a data bus or another communication path. In one embodiment, the lighting system 130 includes a memory 220 that stores a control module 230. The memory 220 is a random-access memory (RAM), read-only memory (ROM), a hard-disk drive, a flash memory, or other suitable memory for storing the control module 230. The control module 230 is, for example, computer-readable instructions that, when executed by the processor 210, cause the processor 210 to perform the various functions disclosed herein.

The control module 230 generally includes instructions that function to control the processor 210 to receive data inputs from one or more embedded sensors 120 and exterior sensors 140 of the accessory 100. The inputs are, in one embodiment, measurements associated with the absorption of near-infrared light of blood vessels in the brain of a user, measurements associated with the electrical activity in the brain of the user, and/or measurements associated with an environment of the user (e.g., measurements relating to nearby objects, such as vehicles, crosswalks, and infrastructure). Accordingly, the control module 230, in one embodiment, controls the respective sensors to provide the data inputs in the form of the sensor data 240. Additionally, while the control module 230 is discussed as controlling the various sensors to provide the sensor data 240, in one or more embodiments, the control module 230 can employ other techniques to acquire the sensor data 240 that are either active or passive. For example, the control module 230 may passively sniff the sensor data 240 from a stream of electronic information provided by the sensors 120 to the lighting system 130. Moreover, the control module 230 can undertake various approaches to fuse data from multiple sensors when providing the sensor data 240 and/or from sensor data acquired over a wireless communication link. Thus, the sensor data 240, in one embodiment, represents a combination of perceptions acquired from multiple sensors.

In one approach, the control module 230 acquires the sensor data 240 from one or more nearby devices wirelessly connected to the accessory 100. The sensor data 240 includes, for example, a location, an orientation, and a behavior of the user as indicated by 3D point cloud data, camera images and/or video from cameras, radar measurements, global positioning system (GPS) data, and so on. Devices may include a smartphone, security system, infrastructure (e.g., a stoplight), etc.

The control module 230 can establish wireless connections by connecting the lighting system 130 directly to local devices and/or to a remote server that acquires the sensor data 240 of the local devices. For example, the control module 230 may establish a wireless communication link with nearby devices using a handshake process (e.g., over a Wi-Fi® network or via Bluetooth®). Responsive to the control module 230 establishing a wireless communication link with local devices and/or a remote server, the control module 230 acquires the sensor data 240 relating to the user wearing the accessory 100. In this way, the control module 230 receives additional sensor data beyond what is acquired from the sensors 120 of the accessory 100.

Moreover, in one embodiment, the lighting system 130 includes a data store 250. In one embodiment, the data store 250 is a database. The data store 250 is, in one embodiment, an electronic data structure stored in the memory 220 or another data store and that is configured with routines that can be executed by the processor 210 for analyzing stored data, providing stored data, organizing stored data, and so on. Thus, in one embodiment, the data store 250 stores data used by the control module 230 in executing various functions. In one embodiment, the data store 250 includes the sensor data 240 along with, for example, metadata that characterize various aspects of the sensor data 240. For example, the metadata can include location coordinates (e.g., longitude and latitude), relative map coordinates or tile identifiers, time/date stamps from when the separate sensor data 240 was generated, and so on.

In one embodiment, the data store 250 further includes blood flow data 260. The blood flow data 260 is, in one or more arrangements, data associated with past blood flow patterns of the user (and/or a group of users) who wears the accessory 100. In one approach, the control module 230 acquires the blood flow data 260 from NIRS sensors at times before (e.g., 0-5 seconds before) the user takes a step. Every time the user takes a step, the blood flow pattern of the user immediately before the user takes a step is recorded and stored in the data store 250 as the blood flow data 260.

The control module 230, in one embodiment, is further configured to perform additional tasks beyond controlling the respective sensors to acquire and provide the sensor data 240 and the blood flow data 260. For example, the control module 230 includes instructions that cause the processor 210 to process the sensor data 240 and the blood flow data 260 to determine whether the user intends on crossing a road crossing. In one arrangement, the control module 230 determines whether the user intends on crossing a road crossing based on an intention of the user to take a step as well as a location and orientation of the user. The control module 230, in one embodiment, determines whether the user intends on taking a step by analyzing the blood flow to identify whether the blood flow to a premotor cortex and/or a motor cortex of the brain is increasing. As previously discussed, increased blood flow to the premotor cortex and/or motor cortex to the brain corresponds to a user planning to take a step as these regions of the brain are linked to functionalities in the toes, feet, and legs of the user Further, as previously discussed, increased blood flow to the dorsolateral prefrontal cortex corresponds to a user planning and/or making decisions. Accordingly, in one embodiment, the control module 230 determines that the user plans on taking a step when the blood flow to the premotor, motor cortex, and/or dorsolateral prefrontal cortex satisfies a change threshold. For example, if the blood flow is increasing to both the premotor cortex and the dorsolateral prefrontal cortex, the control module 230 determines that the user is planning on taking a step.

Accordingly, in one arrangement, the control module 230 processes the absorption data acquired by the NIRS sensors to identify regions of the brain that show an increased concentration of oxygenated hemoglobin in local blood vessels. If the premotor cortex, motor cortex, and/or dorsolateral prefrontal cortex have an increased concentration of oxygenated hemoglobin compared to the other regions of the brain or compared to a previous point in time (e.g., an increase that is greater than a threshold amount of change based on a statistical analysis of blood flow over time, such as in the range of 10-100%), the control module 230 determines that the blood flow increase satisfies the change threshold and that the user intends on taking a step as the blood flow of the user is increasing to the regions of the brain associated with the user planning on taking a step. On the other hand, if the concentration of oxygenated hemoglobin in the premotor, motor cortex, and/or dorsolateral prefrontal cortex does not change, changes only slightly (e.g., less than a threshold amount of change based on a statistical analysis of the blood flow over time, such as in the range of 0-10%), or decreases (e.g., a decrease that is greater than a threshold amount of change based on a statistical analysis of the blood flow over time, such as in the range of 10-100%) in comparison to a previous point in time and/or the concentration of oxygenated hemoglobin in the premotor, motor cortex, and/or dorsolateral prefrontal cortex is less than in other regions of the brain, then the control module 230 determines that the blood flow to the premotor, motor cortex, and/or dorsolateral prefrontal cortex does not satisfy the change threshold and that the user does not intend on taking a step because the blood flow of the user is not increasing to the areas of the brain associated with the user planning on taking a step.

Further, it should be understood that while the discussion of measuring blood flow is described in relation to measuring increases/decreases in oxygenated hemoglobin in local blood vessels, in one or more arrangements, the control module 230 processes the absorption data acquired by the NIRS sensors to identify regions of the brain that subsequently show an increased concentration of deoxygenated hemoglobin in the local blood vessels. For example, when brain activity increases to different regions of the brain, the oxygenated hemoglobin in these regions of increased activity are metabolized/consumed, thereby causing the hemoglobin to become deoxygenated. Accordingly, increases in deoxygenated hemoglobin may similarly indicate increased blood flow and thus increased brain activity in various regions of the brain. In one embodiment, if the premotor cortex, motor cortex, and/or dorsolateral prefrontal cortex have an increased concentration of deoxygenated hemoglobin compared to the other regions of the brain or compared to a previous point in time (e.g., an increase that is greater than a threshold amount of change based on a statistical analysis of blood flow over time, such as in the range of 10-100%), the control module 230 determines that the blood flow increase satisfies the change threshold and that the user intends on taking a step as the blood flow of the user is increasing to the regions of the brain associated with the user planning on taking a step. On the other hand, if the concentration of deoxygenated hemoglobin in the premotor, motor cortex, and/or dorsolateral prefrontal cortex does not change, changes only slightly (e.g., less than a threshold amount of change based on a statistical analysis of the blood flow over time, such as in the range of 0-10%), or decreases (e.g., a decrease that is greater than a threshold amount of change based on a statistical analysis of the blood flow over time, such as in the range of 10-100%) in comparison to a previous point in time and/or the concentration of deoxygenated hemoglobin in the premotor, motor cortex, and/or dorsolateral prefrontal cortex is less than in other regions of the brain, then the control module 230 determines that the blood flow to the premotor, motor cortex, and/or dorsolateral prefrontal cortex does not satisfy the change threshold and that the user does not intend on taking a step because the blood flow of the user is not increasing to the areas of the brain associated with the user planning on taking a step.

In one embodiment, the control module 230 analyzes the blood flow of the user by using a heuristic approach which includes comparing the blood flow to the blood flow data 260. As previously discussed, the blood flow data 260 includes previous blood flow patterns associated with the user planning on taking a step. Accordingly, when the blood flow correlates with the past blood flow patterns of the user, the control module 230 determines that the user intends on taking a step. On the other hand, when the blood flow does not align with the past blood flow patterns associated with the user planning on taking a step, the control module 230 determines that the user does not intend on taking a step.

In one arrangement, the control module 230 analyzes the blood flow of the user to determine whether the user intends on taking a step by using a machine learning model embedded within the control module 230. The machine learning model is, in one embodiment, a deep neural network, such as a recurrent neural network (RNN) that is trained to recognize learned blood flow patterns associated with the user or a group of users intending on taking a step. For example, the RNN may be trained to identify instances when the user intends on taking a step using the blood flow data 260 and/or blood flow data from a group of users as training data. Accordingly, in one approach, the control module 230 determines that the user intends on taking a step when the RNN determines that the blood flow is indicative of the expected blood flow of the user or group of users at a time immediately before the user takes a step.

In any case, responsive to the control module 230 determining that the user intends on taking a step, the control module 230 determines whether the user is likely to cross a road crossing based on the location and position of the user. In one arrangement, the control module 230 processes the location data (e.g., GPS data) about the user to determine if the user is located in an area where the user is likely to cross a street. Areas where the user is likely to cross the street include, for example, an area that includes a crosswalk, an area that includes light signals, an area across the street from a frequently visited area or a final destination of the user. In one approach, instead of or in addition to using GPS data to determine the location of the user, the control module 230 analyzes the sensor data 240 acquired from the sensors 140 and/or sensors from nearby infrastructure to identify the location of the user. For example, the control module may process image data to identify crossable areas, such as crosswalks, streets, etc., in the vicinity of the user.

In addition to analyzing the location, the control module 230, in one embodiment, determines whether the user is likely to cross by processing and analyzing the sensor data 240 associated with the position, orientation, and behavior of the user. As previously discussed, the sensor data 240 associated with the position, orientation, and behavior of the user may include image, video, radar, and/or LiDAR data captured by the exterior sensors 140 of the accessory 100 and/or by nearby devices. In one arrangement, the control module 230 identifies the position, orientation, and behavior of the user by extracting features from the acquired image, video, radar, and/or LiDAR data. In various approaches, the control module 230 employs different object recognition techniques to identify the position, orientation, and behavior of the user. The particular technique employed to identify the position/orientation/behavior may depend on available sensors near the accessory 100, computational abilities (e.g., processor power) of the accessory 100, and so on.

In one approach, the control module 230 uses a machine learning algorithm embedded within the control module 230, such as a convolutional neural network (CNN), to perform semantic segmentation over the sensor data 240 associated with the location, position, orientation, and behavior of the user from which further information is derived. Of course, in further aspects, the control module 230 may employ different machine learning algorithms or implements different approaches for performing the associated functions, which can include deep convolutional encoder-decoder architectures, or another suitable approach that identifies objects represented in the image. Whichever particular approach the control module 230 implements, the control module 230 provides an output identifying the objects represented in the sensor data 240. In this way, the control module 230 identifies characteristics about the user, such as the location, position, orientation, and behavior of the user from the sensor data.

Accordingly, the control module 230 correlates identified characteristics about the user with an intention of the user. In one embodiment, the control module 230 may process image and/or video data to identify specific characteristics indicative of a user's relative position, orientation, and behavior at a location, such as which direction the user's face is pointed, where the user is standing in relation to a crosswalk or stop light, where the user's eyes are directed, whether the user is engaged in conversation, etc. For example, the control module 230 may correlate characteristics about the user, such as the user facing a crosswalk, standing near a crosswalk, and looking across the crosswalk with an intention to cross the crosswalk. On the other hand, the control module 230 may correlate characteristics about the user, such as the user facing away from a crosswalk and talking to a friend near the crosswalk with an intention to stay put and not cross the crosswalk.

Although the control module 230 is described as processing the sensor data 240 within the lighting system 130 of the accessory 100, it should be understood that in one or more arrangements, the sensor data 240 is processed and analyzed off-board the accessory 100. For example, the sensor data 240 may be sent to and processed in a cloud-computing environment accessible by the control module 230. In this way, the strain on computational resources of the accessory 100 can be reduced.

Responsive to determining that the user intends on crossing a street, the control module 230 communicates an intent to cross using the accessory 100. In one approach, the control module 230 communicates the intent to cross by controlling the lighting mechanism 110 of the accessory 100. The control module 230 can control the lighting mechanism 110 to activate and output a light that is visible by surrounding road users. In one arrangement, the control module 230 controls the lighting mechanism 110 to output the light at a preset brightness, color, and flash pattern, such as a solid, green light.

In one configuration, the control module 230 varies an output of the lighting mechanism 110 in response to determining a confidence level associated with the user's intent to cross. The control module 230, in one embodiment, varies the output of the lighting mechanism 110 by varying a brightness, a flash pattern, and/or a color of the lighting mechanism 110 to reflect the confidence level. In one approach, the control module 230 determines the confidence level using a heuristic-based comparison between the blood flow of the user and a learned blood flow pattern associated with the user taking a step as well as a location of the user. For example, as previously discussed, past blood flow patterns associated with the user taking a step may be stored in the data store 250 as the blood flow data 260. However, if the user has never worn the accessory 100 or has only worn the accessory 100 for a short period of time, the blood flow data 260 may not be well-established or may not have sufficient data for comparison. Accordingly, the control module 230 may determine whether the user intends on taking a step based on the assumption that blood flow tends to increase to the premotor, motor, and/or dorsolateral prefrontal cortex without any regard to how the individual user's blood flow uniquely changes in response to the user planning on taking a step. As such, when the blood flow data 260 is not well-established for the user, the control module 230 assigns a low confidence level to the user's intent on taking a step. On the other hand, when the blood flow data 260 of the user is well-established (i.e., because the user has worn the accessory 100 enough times for the blood flow data 260 to establish a comprehensive blood flow data base associated with the user intending on taking a step), the control module 230 assigns a high confidence level to the user's intent on taking a step.

In one arrangement, rather than determining the confidence level based on a heuristic-based comparison with the blood flow data 260, the control module 230 determines the confidence level from the output of the machine learning model. For example, the machine learning model can determine whether the blood flow of the user matches, is substantially similar, or otherwise correlates to a learned blood flow of the user associated with the user intending on taking a step. If the blood flow of the user does not match an expected/learned blood flow, then the control module 230 assigns a low confidence level to the user's intent on taking a step. On the other hand, if the blood flow of the user highly correlates with a learned blood flow, then control module 230 assigns a high confidence level to the user's intent on taking a step.

In one approach, the control module 230 also considers the location of the user in addition to the confidence level as determined by comparing the blood flow to the blood flow data 260 and/or based on the output of the machine learning model in assigning the confidence level. For example, if the user is near a crosswalk, near an intersection, and/or across the street from the user's final destination, the control module 230 assigns a high confidence level to the user intending on crossing a street. On the other hand, if the user is, for example, standing in the middle of a sidewalk, the control module 230 assigns a low confidence level to the user intending on crossing a street.

When the identified confidence level is low enough to assume that the user does not intend on crossing a street (i.e., when there is a 0-1% increase in blood flow of the user to the premotor, motor, and/or prefrontal dorsolateral cortex relative to a previous point in time and/or in comparison to other regions of the brain and the user is in a location that would not allow a user to cross a street), the control module 230 controls the lighting mechanism 110 to deactivate or otherwise stay in an "off" state until the user does intend on crossing the street. On the other hand, when the confidence level is low but it is still possible that the user intends on crossing a street (i.e., there is a 0-10% increase in blood flow to the premotor, motor, and/or dorsolateral prefrontal cortex relative to a previous point in time and/or in comparison to other regions of the brain but the user is standing 5 feet away from a crosswalk), the control module 230 controls the lighting mechanism 110 to emit light in a manner that conveys the low confidence level. For example, the control module 230 may control the lighting mechanism 110 to emit a dull, yellow light with no flash pattern. On the other hand, when the confidence level is high, the control module 230 may control the lighting mechanism 110 to emit a bright, green light with a high frequency flash pattern.

In addition to varying the output of the lighting mechanism 110 in relation to the confidence level, in one arrangement, the control module 230 varies the output of the lighting mechanism 110 based on preferences of nearby drivers. In one embodiment, the control module 230 communicates with nearby vehicles to indicate a user's intent to cross a street. As previously discussed, the control module 230 may communicate with nearby vehicles by establishing wireless connections and/or via a remote server. In any case, when a vehicle is in the vicinity of a user who intends on crossing a street (e.g., when a vehicle is at or approaching the same crosswalk as the user), the control module 230 can notify the vehicle of the user's intention to cross by sending a notification or message to the vehicle (e.g., using an established wireless communication link, vehicle-to-everything (V2X) communications, vehicle-to-pedestrian (V2P) communications, etc.). For example, the vehicle may receive the notification on a heads-up display.

In one approach, the control module 230 receives driver data from nearby vehicles. Driver data may include communication preferences of a driver of the vehicle. The communication preferences of the driver include, for example, colors and flash patterns that invoke fast reaction times in the driver. The control module 230, in one embodiment, controls the lighting mechanism 110 to output the light according to the communication preferences of the driver. As an example, if a nearby driver's attention is easily drawn to bright, purple flashing lights, the control module 230 controls the lighting mechanism 110 to output a bright, purple flashing light. In this way, the lighting system 130 improves communicating a user's intention to cross a street.

Figure 3:
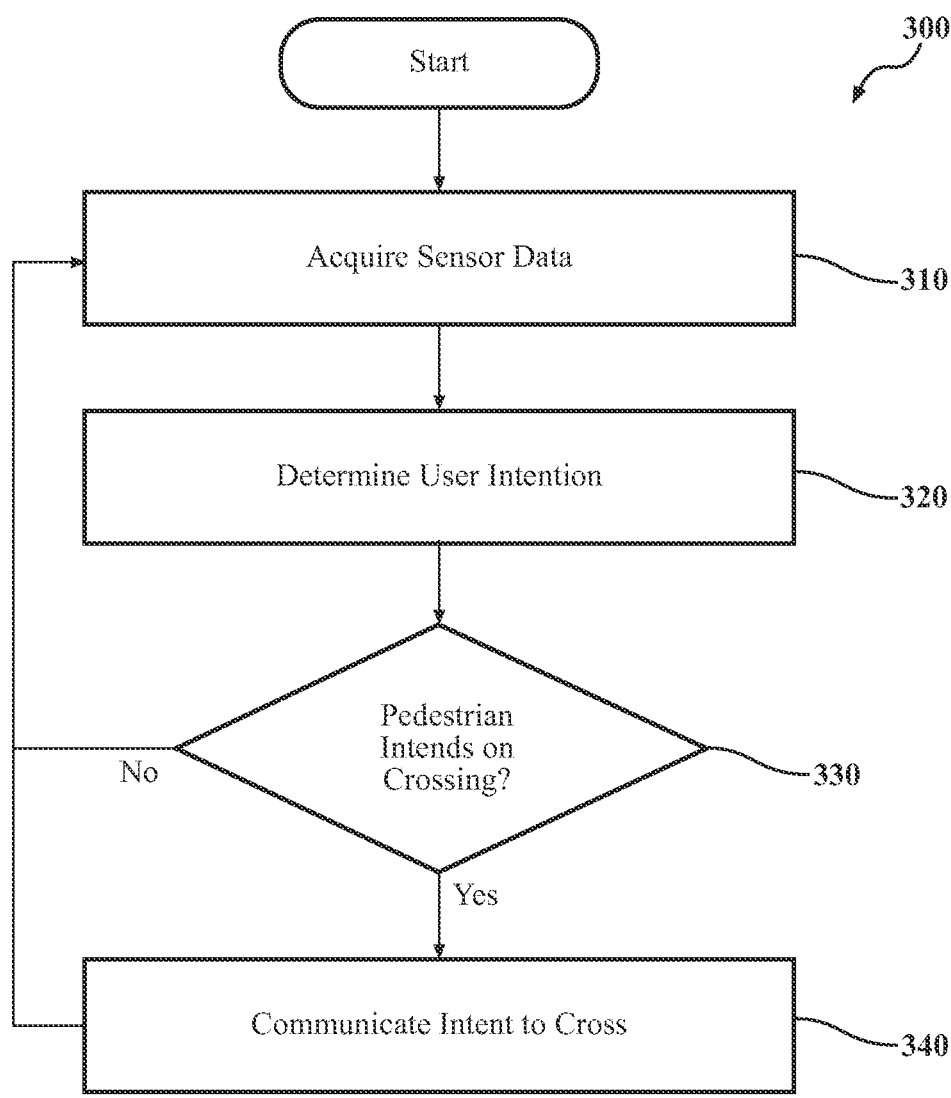
FIG. 3 illustrates one embodiment of a method that is associated with communicating an intention of a user to cross a roadway.

Additional aspects of improving the communication of a user's intention to cross a street will be discussed in relation to FIG. 3. FIG. 3 illustrates a flowchart of a method 300 that is associated with improving the communication of a user's intention using a lighting mechanism. Method 300 will be discussed from the perspective of the lighting system 130 of FIGS. 1, and 2. While method 300 is discussed in combination with the lighting system 130, it should be appreciated that the method 300 is not limited to being implemented within the lighting system 130 but is instead one example of a system that may implement the method 300.

At 310, the control module 230 controls the embedded sensor system 120 and the exterior sensor system 140 to acquire the sensor data 240. In one embodiment, the control module 230 controls the sensors 120, where the sensors 120 are, for example, NIRS sensors, EEG sensors, and/or other sensors embedded in the accessory 100 to take measurements associated with the brain activity of the user. As part of controlling the sensors to acquire the sensor data 240, it is generally understood that the sensors acquire the sensor data 240 of a region covering the brain of the user with data acquired from multiple sensors generally overlapping in order to provide for a comprehensive sampling of the user's brain activity. In one arrangement, the control module 230 controls the sensors 140 to acquire the sensor data 240 to take measurements associated with an environment of the user, such as to take measurements about nearby vehicles, infrastructure, crosswalks, etc.

Additionally, the control module 230 controls sensors external to the accessory 100, such as cameras from nearby infrastructure to acquire the sensor data 240 associated with the user's position, orientation, and behavior. As part of controlling the sensors to acquire the sensor data 240, it is generally understood that the sensors acquire the sensor data 240 of a region around the user with data acquired from different types of sensors generally overlapping in order to provide for a comprehensive sampling of the user. The sensor data 240 of the region around the user could include data related to relevant infrastructure near the user (e.g., a crosswalk, stoplight, etc.) or data related to the user. Thus, the control module 230, in one embodiment, controls the sensors to acquire the sensor data 240 about the user.

Moreover, in further embodiments, the control module 230 controls the sensors to acquire the sensor data 240 at successive iterations or time steps. Thus, the lighting system 130, in one embodiment, iteratively executes the functions discussed at block 310 to acquire the sensor data 240 and provide information therefrom. Furthermore, the control module 230, in one embodiment, executes one or more of the noted functions in parallel for separate observations in order to maintain updated perceptions. In one embodiment, the control module 230 acquires the sensor data 240 from multiple sensors 120 and sensors 140. When acquiring data from multiple sensors (e.g., data from multiple NIRS sensors) about one region of the brain or about an area external to the accessory 100, the control module 230 fuses the data together to form the sensor data 240 and to provide for improved determinations of detection, location, and so on.

At 320, the control module 230 processes the sensor data 240 to determine an intention of the user wearing the accessory 100. In one embodiment, the control module 230 determines the user intention by determining whether the user intends on taking a step and whether the user is in a location and orientation associated with the user crossing a street. The control module 230 determines whether the user is taking a step by, in one configuration, analyzing the blood flow in the brain of the user from the NIRS sensors. In one arrangement, the NIRS sensors acquire absorption data associated with the absorption level of blood vessels in different regions of the user's brain. In one embodiment, the control module 230 processes the absorption data to identify regions of the brain that show an increased concentration of oxygenated hemoglobin in local blood vessels. A region with an increased concentration of oxygenated hemoglobin indicates increased brain activity and thus an increased blood flow to that region of the brain.

In one embodiment, the control module 230 analyzes the blood flow to determine whether the premotor, motor, and/or dorsolateral prefrontal cortex of the brain reflects absorption levels associated with an increased concentration of oxygenated hemoglobin (i.e., blood flow). In one arrangement, the control module 230 determines that the user plans on taking a step when the blood flow to the premotor, motor, and/or dorsolateral prefrontal cortex satisfies a change threshold. In one arrangement, responsive to the control module 230 determining that there is an increase in blood flow to the premotor, motor, and/or dorsolateral prefrontal cortex of the brain relative to a previous point in time and/or in comparison to other regions of the brain (e.g., an increase that is greater than a threshold amount based on a statistical analysis of the blood flow compared to a previous point in time, such as in the range of 10-100%), the control module 230 determines that the blood flow satisfies the change threshold and that the user intends on taking a step as these regions of the brain correlate to brain activity associated with a user controlling their toes, feet, and legs. In one approach, responsive to the control module 230 determining that the concentration of oxygenated hemoglobin in the premotor, motor, and/or dorsolateral prefrontal cortex has not changed, increased only slightly (e.g., less than a threshold amount of change based on a statistical analysis of the blood flow compared to a previous point in time, such as in the range of 0-2%), or decreased in comparison to a previous point in time and/or the concentration of oxygenated hemoglobin in the premotor, motor, and/or dorsolateral prefrontal cortex is less than in other regions of the brain (e.g., a decrease that is greater than a threshold amount based on a statistical analysis of the blood flow compared to a previous point in time, such as in the range of 10-100%), then the control module 230 determines that the blood flow does not satisfy the change threshold and that the user does not intend on taking a step as the blood flow of the user is not increasing to the areas of the brain associated with the user planning on taking a step. In one embodiment, the control module 230 analyzes the blood flow of the user by comparing the blood flow to the blood flow data 260. As previously discussed, the blood flow data 260 includes past blood flow patterns associated with the user planning on taking a step. The past blood flow pattern is recorded and stored in the data store 250 and is used as a baseline by the control module 230 in determining that the user's blood flow corresponds to the user intending on taking a step.

In one arrangement, rather than determining the intention of the user by comparing the blood flow to the blood flow data 260, the control module 230 analyzes the blood flow of the user by using a machine learning model embedded within the control module 230. The machine learning model is, in one embodiment, a deep neural network, such as a recurrent neural network (RNN) that is trained to recognize learned blood flow patterns associated with the user or a group of users intending on taking a step. For example, the RNN may be trained to identify instances when the user intends on taking a step using the blood flow data 260 as training data. In one arrangement, the RNN uses blood flow data from a group of users at times immediately before the users have taken steps as training data. In any case, the control module 230 determines that the user intends on taking a step when the RNN determines that the blood flow correlates to a learned blood flow of the user/users associated with the user/users taking a step at a time immediately before the user takes a step.

Responsive to the control module 230 determining that the user intends on taking a step, the control module 230 determines whether the user is likely to cross a street based on the location and position of the user. In one arrangement, the control module 230 processes location data (e.g., GPS data) about the user to determine if the user is located in an area where the user is likely to cross a street. For example, the control module 230 may receive the GPS data from a smartphone or other device carried by the user. Areas where the user is likely to cross the street include, for example, an area that includes a crosswalk, an area that includes light signals, an area across the street from a frequently visited area or a final destination of the user. For example, if the location data indicates that the user is standing at a crosswalk across the street from a final destination of the user, the control module 230 determines that the user is likely to cross the street. In one embodiment, instead of or in addition to using GPS data to identify the location of the user, the control module 230 processes image/video data acquired by the sensors 140 and/or by nearby devices to identify whether the user is in a crossable area. Crossable areas are, for example, crosswalks, areas near a stoplight, streets, etc.

In addition to location information, in one embodiment, the control module 230 processes the sensor data 240 associated with the position, orientation, and behavior of the user to determine whether the user is likely to cross a road crossing. As previously discussed, the sensor data 240 associated with the position, orientation, and behavior of the user may include image, video, radar, and/or LiDAR data captured by the exterior sensors 140 of the accessory 100 and/or by nearby devices. In one arrangement, the control module 230 identifies the position, orientation, and behavior of the user by extracting features from the acquired image, video, radar, and/or LiDAR data. In various approaches, the control module 230 employs different object recognition techniques to identify the position, orientation, and behavior of the user. The particular technique employed to identify the position/orientation/behavior may depend on available sensors near the accessory 100, computational abilities (e.g., processor power) of the accessory 100, and so on.

In one approach, the control module 230 uses a machine learning algorithm embedded within the control module 230, such as a convolutional neural network (CNN), to perform semantic segmentation over the sensor data 240 associated with the location, position, orientation, and behavior of the user from which further information is derived. Of course, in further aspects, the control module 230 may employ different machine learning algorithms or implements different approaches for performing the associated functions, which can include deep convolutional encoder-decoder architectures, or another suitable approach that identifies objects represented in the image. Whichever particular approach the control module 230 implements, the control module 230 provides an output identifying the objects represented in the sensor data 240. In this way, the control module 230 identifies characteristics about the user, such as the location, position, orientation, and behavior of the user from the sensor data.

In one embodiment, the control module 230 may identify specific characteristics indicative of a user's relative position, orientation, and behavior at a location, such as which direction the user's face is pointed, where the user is standing in relation to a crosswalk or stop light, where the user's eyes are directed, whether the user is engaged in conversation, etc. For example, if the user is oriented in a manner that causes their face to be directed towards the other end of a street, the user is in an orientation associated with the user likely intending on crossing the street. On the other hand, if the user is oriented in a manner that causes their face to be directed away from the other side of a street, then the user is unlikely to cross the street. The control module 230 may determine which direction a user's face is directed towards based on the image and/or video data captured by sensors of nearby infrastructure. Regarding the position of the user in relation to a crosswalk or stop light, if the user is within a threshold distance of a crosswalk (e.g., less than three feet from one end of the crosswalk) or stop light, then the user's relative closeness to the crosswalk/stop light indicates that the user is currently standing in a position that indicates a likelihood to cross the street. However, if the user is standing far from a common point for pedestrians to cross a street (e.g., the user is in the middle of a sidewalk 10 feet away from the nearest crosswalk), then the user is in a position that indicates the user is unlikely to cross a street. The control module 230 can determine the relative position of the user based on the GPS data and image/video data captured by nearby infrastructure.

In one arrangement, the control module 230 determines the eye position, eye movement, head position, and/or head movement of the user to determine where the user's eyes are directed. For example, the control module 230 may process the sensor data 240 to identify that the user's eyes are directed to their phone, a friend, or a building on the same side of the street as the user. In this case, the control module 230 determines that the user is unlikely to cross a street as the user's eyes are not directed towards the other side of the street. On the other hand, if the control module 230 processes the sensor data 240 to identify that the user's eyes are directed to a fixture across the street, the control module 230 determines the user is likely to cross the street. In one approach, the control module 230 determines whether the user is engaged in conversation or otherwise distracted. For example, if the control module 230 processes the image and/or video data to determine that the user is currently conversing with a friend near a crosswalk, the control module 230 determines that the user likely does not intend on crossing the crosswalk. Accordingly, in one embodiment, the control module 230 determines the intention of the user to cross a street based on the behavior, position, and orientation of the user as identified by the sensor data 240 captured by nearby sensors.

In one embodiment, the control module 230 determines whether the user is likely to cross a street depending on whether the user enters an input on a crosswalk signal. For example, crosswalks may include light posts or stop lights with buttons that can be pressed by a user when a user wants to receive a signal that it is safe to cross the street. Accordingly, the control module 230 may determine that the user intends on crossing the street by processing the image and/or video data near a crosswalk to identify that the user entered an input indicative of an intention to cross the street. On the other hand, the control module 230 may determine that the user does not intend on crossing the street by processing the sensor data 240 to determine that the user did not enter an input indicative of an intention to cross the street.

At 330, the control module 230 determines whether the user intends on crossing the street. In one embodiment, the control module 230 determines that the user intends on crossing when the blood flow and location/position/orientation of the user both indicate an intention to cross a street. For example, if blood flow is increasing to the premotor, motor, and/or dorsolateral prefrontal cortex of the user, the user is standing near a crosswalk while facing the other side of the street, and the user entered an input indicative of an intent to cross the street on infrastructure associated with the crosswalk, the control module 230 determines that the user intends on crossing the street. In one embodiment, the control module 230 determines that the user intends on crossing a street based on the confidence level associated with the user intending on crossing the street.

In one embodiment, the confidence level is based on the correlation between the blood flow and learned or expected blood flow patterns of the user and the location of the user. In one arrangement, the control module 230 determines the confidence level by comparing the blood flow of the user to the blood flow data 260. If the blood flow is substantially similar to a past blood flow pattern of the user associated with the user planning on taking a step, the control module 230 assigns a high confidence level to the user's intention to take a step. On the other hand, if the blood flow differs greatly from the past blood flow patterns of the user or if the past blood flow pattern associated with the user has not been developed yet, then the control module 230 assigns a low confidence level to the user's intention to take a step. For example, although the blood flow in the brain of the user may be increasing to the premotor, motor, and/or dorsolateral prefrontal cortex of the brain of the user, the control module 230 may not have a baseline to compare the blood flow to, thus rendering the control module 230 less confident in the determination that the user intends on taking a step.

In one arrangement, rather than determining the confidence level based on a correlation between the blood flow and the blood flow data 260, the control module 230 determines the confidence level based on the output of the machine learning model. For example, the machine learning model can determine whether the blood flow of the user matches, is substantially similar, or otherwise correlates to a learned blood flow of the user associated with the user intending on taking a step. If the blood flow of the user does not correlate with the learned blood flow, then the control module 230 assigns a low confidence level to the user's intent on taking a step. On the other hand, if the blood flow of the user correlates the learned blood flow, then control module 230 assigns a high confidence level to the user's intent on taking a step.

In one approach, the control module 230 considers the location of the user in addition to the correlation between the blood and a learned blood flow of the user in assigning the confidence level. In one arrangement, the control module 230 determines the location of the user using the exterior sensors 140 of the accessory 100 and/or based on sensor data received from external devices. For example, if the control module 230 determines that the user is near a crosswalk, near an intersection, and/or across the street from the user's destination based on the sensor data, the control module 230 assigns a high confidence level to the user intending on crossing a street. On the other hand, if the user is, for example, standing in the middle of a sidewalk, the control module 230 assigns a low confidence level to the user intending on crossing a street.

Further, the control module 230 can consider the orientation, position, and behavior of the user in assigning the confidence level. As an example, if the user is facing away from a crosswalk, looking at their phone near a crosswalk, and/or otherwise acting as if they do not intend on crossing the street, the control module 230 assigns a low confidence level to the user intending on crossing the street. If, on the other hand, the user is facing towards a crosswalk and looking across the street, the control module 230 assigns a high confidence level to the user intending on crossing the street.

In one approach, the control module 230 determines the behavior of the user by analyzing the sensor data 240 associated with a gait/speed/movement of the user. For example, a user may wear a smartwatch that informs the control module 230 of the current gait and speed of the user. Accordingly, responsive to the gait/speed/movement of the user reflecting an intention of the user to cross the crosswalk, the control module 230 assigns a high confidence level to the user intending on crossing the street. Further, the user may wear a galvanic skin response (GSR) sensor that provides information relating to a skin conductivity/skin arousal of the user. When the skin conductivity of the user increases (e.g., by 5-10%), the control module 230 determines that the user intends on making a decision, such as intending on crossing a crosswalk. As such, responsive to the skin conductivity of the user increasing, the control module 230 assigns a high confidence level to the user intending on crossing the crosswalk. On the other hand, if the skin conductivity of the user does not increase, the control module 230 assigns a low confidence level to the user intending on crossing the crosswalk. Responsive to the control module 230 determining the user intends on crossing the street, the control module 230 controls the lighting mechanism 110 to convey the intention at 340. Otherwise, the control module 320 continues to acquire the sensor data 240, as discussed at 310.

At 340, the control module 230 communicates the user's intent to cross by controlling the lighting mechanism 110. In one approach, the control module 230 activates the lighting mechanism 110 responsive to determining that the user intends on crossing a street. The lighting mechanism 110 may output light according to a preset configuration. For example, the user may manually set the light output from the lighting mechanism 110. The preset configuration may include preset configurations for the color, brightness, and/or flash pattern of the lighting mechanism 110.

In arrangement, the control module 230 varies the output of the lighting mechanism 110 based on the confidence level associated with the user intending on crossing a street. The control module 230 may vary the color, brightness, and/or flash pattern of the lighting mechanism 110 based on the confidence level. For example, a greater luminescence, a bolder color, and a high frequency flash rate may correspond to a high confidence level while a lower luminescence, duller color, and a low frequency flash rate/solid output of light may correspond to a low confidence level.

When the control module identifies a low confidence level (e.g., the blood flow is increasing to the premotor, motor, and/or dorsolateral prefrontal cortex but the user is standing 5 feet away from a crosswalk or the machine learning model determines the blood flow correlates only slightly to learned blood flow patterns), the control module 230 controls the lighting mechanism 110 to emit light in a manner that conveys the low confidence level. For example, the control module 230 may control the lighting mechanism 110 to emit a dull, yellow light with no flash pattern. On the other hand, when the control module 230 identifies a high confidence level (e.g., when the machine learning model determines that the blood flow correlates to a learned blood flow pattern of the user), the control module 230 controls the lighting mechanism 110 to emit a bright, green light with a high frequency flash pattern, for example.

In one approach, the control module 230 controls the lighting mechanism 110 to vary the output of the light depending on preferences of nearby drivers. In one embodiment, the control module 230 receives driver data from nearby vehicles. Driver data may include communication preferences of a driver of the vehicle, where the communication preferences correspond to visuals a driver is likely to be drawn to and/or react quickly to. The visuals a driver is likely to be drawn to and/or react quickly to can include colors and flash patterns. Accordingly, responsive to receiving communication preferences of a nearby driver, the control module 230, in one embodiment, controls the lighting mechanism 110 to output the light according to the communication preferences of the driver. As an example, if a nearby driver's attention is easily drawn to bright, purple flashing lights, the control module 230 controls the lighting mechanism 110 to output a bright, purple flashing light.

In one arrangement, the control module 230 controls additional lighting mechanisms attached to the user to indicate an intention of the user to cross. For example, the control module 230 may communicate with other devices connected to the user, such as shoes, clothing, etc., that also include lighting mechanisms. In response to determining that the user has additional lighting mechanisms, the control module 230 controls the additional lighting mechanisms to output light in the same manner as the accessory 100 (e.g., according to the confidence level, driver preferences, etc.)

In addition to controlling other devices of the user to output light, in one approach, the control module 230 controls additional wearable devices of the user to facilitate/prevent movement of the user depending on the intention of the user to cross and a safety condition associated with crossing a road crossing. The safety condition is, for example, associated with the driving behavior of nearby vehicles. In one embodiment, the control module 230 analyzes the sensor data 240 to determine whether a current driving behavior (e.g., speed, acceleration, etc.) of an approaching vehicle indicates that the vehicle notices the lighting mechanism 110 of the user.

For example, if the approaching vehicle is speeding up as the vehicle approaches the user, the control module 230 determines that the vehicle does not intend on allowing the user to cross a road crossing. In response to determining that a vehicle does not intend on allowing the user to cross the road crossing, the control module 230 determines that the safety condition is unsafe and that the user should not cross the road crossing. Accordingly, to prevent the user from crossing, the control module 230, in one approach, controls a smart accessory, such as smart pants, smart shoes, etc., to restrict movement of the user by, for example, locking into a position that prevents movement, applying a force to the user, and/or using other techniques. Further, responsive to the control module 230 determines that it is unsafe to cross a road crossing, the control module 230, in one embodiment, controls the smart accessory to output a haptic warning to the user. On the other hand, in response to the control module 230 determining that the safety condition is safe (e.g., approaching vehicles are decelerating, a driver is motioning for the user to cross, etc.), the control module 230, in one arrangement, controls the smart accessory to facilitate movement of the user by, for example, unlocking a position that prevents movement, moving the smart accessory in the direction of the road crossing, and the like. Discussion will now turn to FIG. 4 to show an example of the accessory 100 indicating a user's intention to cross a street.

Figure 4:
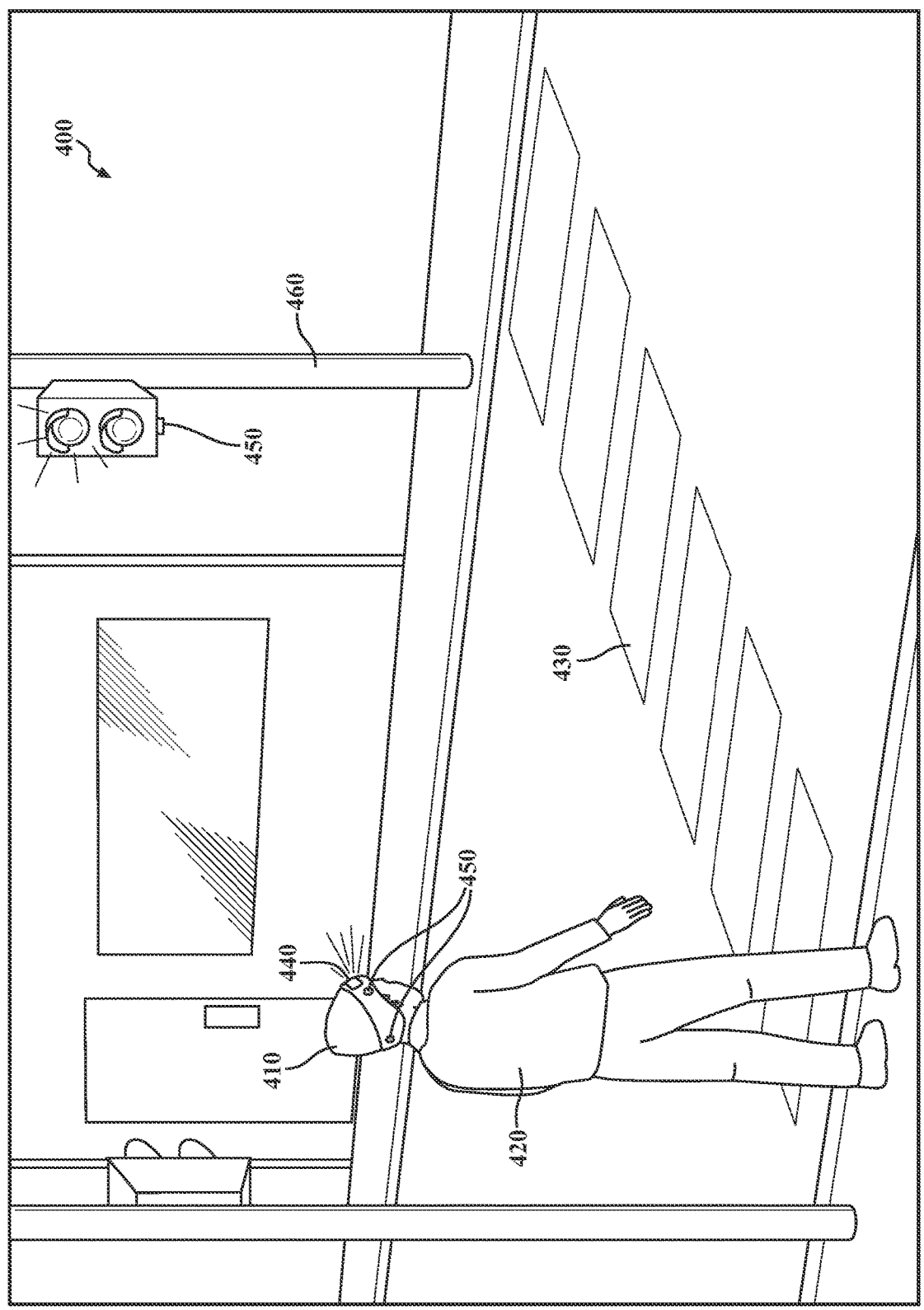
FIG. 4 shows an illustrative example of an accessory indicating a user intention to cross a street.

FIG. 4 illustrates one embodiment of an accessory indicating a user intention to cross a street. FIG. 4 will be discussed from the perspective of the lighting system 130 of FIGS. 1 and 2. Referring to FIG. 4, an environment 400 associated with an accessory 410 indicating an intention of a user 420 to cross a crosswalk 430 is illustrated. As illustrated, the control module 230 activates a lighting mechanism 440 of the accessory 100 responsive to determining that the user 420 intends on crossing the crosswalk 430. The control module 230 determines that the user 420 intends on crossing the crosswalk 430 because the blood flow of the user 420 is increasing to the premotor, motor, and/or dorsolateral prefrontal cortex of the brain of the user 420 and because the user 420 is standing close to and facing the crosswalk 430, as indicated by sensors 450 of the accessory 100 and/or of nearby infrastructure 460. Because both the blood flow and position/orientation of the user 420 indicate an intention to cross the crosswalk 430, the control module 230 activates the lighting mechanism 440. In this way, the lighting system 130 improves communicating a user's intention to cross a street.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
   one or more processors;
   a memory communicably coupled to the one or more processors and storing instructions that, when executed by the one or more processors, cause the one or more processors to:
   acquire sensor data identifying a blood flow in a brain of a user;
   determine whether the user intends on crossing a street based, at least in part, on the sensor data; and
   responsive to determining the user intends on crossing the street, communicate an intent to cross using an accessory.

2. The system of claim 1, wherein the instructions to determine whether the user intends on crossing include instructions to:
   determine whether a user intends on taking a step; and
   determine whether a user is in a location and orientation associated with crossing the street.

3. The system of claim 1, wherein the instructions to determine whether the user intends on crossing include instructions to:
   analyze the blood flow to identify whether the blood flow to at least one of a premotor cortex of the brain, a motor cortex of the brain, and a dorsolateral prefrontal cortex of the brain satisfies a change threshold.

4. The system of claim 3, wherein the instructions further include instructions to:
   responsive to identifying that the blood flow is increasing to the at least one of the premotor cortex, the motor cortex, and the dorsolateral prefrontal cortex in relation to at least one of: a previous time and a separate region of the brain, determine that the blood flow satisfies the change threshold, and
   identify that the user intends on taking a step, identify that the user intends on taking a step.

5. The system of claim 1, wherein the instructions to determine whether the user intends on crossing include instructions to:
   analyze the blood flow using a machine learning model to correlate the blood flow with a learned blood flow pattern, wherein the learned blood flow pattern is associated with the user taking a step.

6. The system of claim 1, wherein the instructions to communicate the intent to cross include instructions to:
   control at least one lighting mechanism of the accessory.

7. The system of claim 6, wherein the instructions to communicate the intent to cross include instructions to:
   vary an output of the lighting mechanism, wherein the output is at least one of: a brightness of the lighting mechanism, a flash pattern of the lighting mechanism, and a color of the lighting mechanism,
   wherein instructions to vary the output include instructions to vary the output responsive to determining a confidence level associated with the intent to cross, and
   wherein the confidence level is based, at least in part, on a correlation between the blood flow and a learned blood flow pattern associated with the user taking a step and a location of the user.

8. The system of claim 1, wherein the instructions to acquire the sensor data include instructions to:
   acquire the sensor data from at least one near infrared spectroscopy sensor embedded in the accessory.

9. A non-transitory computer-readable medium including instructions that when executed by one or more processors cause the one or more processors to:
   acquire sensor data identifying a blood flow in a brain of a user;
   determine whether the user intends on crossing a street based, at least in part, on the sensor data; and
   responsive to determining the user intends on crossing the street, communicate an intent to cross using an accessory.

10. The non-transitory computer-readable medium of claim 9, wherein the instructions to determine whether the user intends on crossing include instructions to:
    analyze the blood flow to identify whether the blood flow to at least one of a premotor cortex of the brain, a motor cortex of the brain, and a dorsolateral prefrontal cortex of the brain satisfies a change threshold.

11. The non-transitory computer-readable medium of claim 10, wherein the instructions further include instructions to:
    responsive to identifying that the blood flow is increasing to the at least one of the premotor cortex, the motor cortex, and the dorsolateral prefrontal cortex in relation to at least one of: a previous time and a separate region of the brain, determine that the blood flow satisfies the change threshold, and
    identify that the user intends on taking a step.

12. The non-transitory computer-readable medium of claim 9, wherein the instructions to determine whether the user intends on crossing include instructions to:
  analyze the blood flow using a machine learning model to correlate the blood flow with a learned blood flow pattern, wherein the learned blood flow pattern is associated with the user taking a step.

13. The non-transitory computer-readable medium of claim 9, wherein the instructions to communicate the intent to cross include instructions to:
  control at least one lighting mechanism of the accessory.

14. A method, comprising:
  acquiring sensor data identifying a blood flow in a brain of a user;
  determining whether the user intends on crossing a street based, at least in part, on the sensor data; and
  in response to determining the user intends on crossing the street, communicating an intent to cross using an accessory.

15. The method of claim 14, wherein determining whether the user intends on crossing includes:
  determining whether a user intends on taking a step; and
  determining whether a user is in a location and orientation associated with crossing the street.

16. The method of claim 14, wherein determining whether the user intends on crossing includes analyzing the blood flow to identify whether the blood flow to at least one of a premotor cortex of the brain, a motor cortex of the brain, and a dorsolateral prefrontal cortex of the brain satisfies a change threshold.

17. The method of claim 16, further comprising:
  responsive to identifying that the blood flow is increasing to the at least one of the premotor cortex, the motor cortex, and the dorsolateral prefrontal cortex in relation to at least one of: a previous time and a separate region of the brain, determining that the blood flow satisfies the change threshold, and
  identifying that the user intends on taking a step.

18. The method of claim 14, wherein determining whether the user intends on crossing includes analyzing the blood flow using a machine learning model to correlate the blood flow with a learned blood flow pattern, wherein the learned blood flow pattern is associated with the user taking a step.

19. The method of claim 14, wherein communicating the intent to cross includes controlling at least one lighting mechanism of the accessory.

20. The method of claim 19, wherein communicating the intent to cross includes varying an output of the lighting mechanism, wherein the output is at least one of: a brightness of the lighting mechanism, a flash pattern of the lighting mechanism, and a color of the lighting mechanism,
  wherein varying the output includes varying the output in response to determining a confidence level associated with the intent to cross, and
  wherein the confidence level is based, at least in part, on a correlation between the blood flow and a learned blood flow pattern associated with the user taking a step and a location of the user.

* * * * *